United States Patent
Qiu et al.

(10) Patent No.: US 12,382,288 B2
(45) Date of Patent: Aug. 5, 2025

(54) CERTIFICATE BASED APPLICATION DESCRIPTORS FOR NETWORK SLICE SELECTION

(71) Applicant: QUALCOMM Incorporated, San Diego, CA (US)

(72) Inventors: Hong Qiu, Beijing (CN); Guomin Yang, Beijing (CN); Ruiming Zheng, Beijing (CN); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/759,218

(22) PCT Filed: Feb. 4, 2020

(86) PCT No.: PCT/CN2020/074268
§ 371 (c)(1),
(2) Date: Jul. 21, 2022

(87) PCT Pub. No.: WO2021/155494
PCT Pub. Date: Aug. 12, 2021

(65) Prior Publication Data
US 2023/0049987 A1    Feb. 16, 2023

(51) Int. Cl.
*H04W 12/069* (2021.01)
*H04W 12/61* (2021.01)
*H04W 48/18* (2009.01)

(52) U.S. Cl.
CPC ......... *H04W 12/069* (2021.01); *H04W 12/61* (2021.01); *H04W 48/18* (2013.01)

(58) Field of Classification Search
CPC ... H04W 12/069; H04W 12/61; H04W 48/18; H04L 2463/121
(Continued)

(56) References Cited

U.S. PATENT DOCUMENTS 11,012,858 B1 *  5/2021  Kozlowski ............. H04L 63/18
2010/0169415 A1   7/2010  Leggette et al.
(Continued)

FOREIGN PATENT DOCUMENTS

| CN | 105981444 A | 9/2016 |
| CN | 110476447 A | 11/2019 |
| WO | 2018171863 A1 | 9/2018 |
| WO | WO-2019229492 A1 | 12/2019 |

OTHER PUBLICATIONS

Supplementary European Search Report—EP20917637—Search Authority—Munich—Jan. 22, 2024.
(Continued)

*Primary Examiner* — Huy C Ho
(74) *Attorney, Agent, or Firm* — Harrity & Harrity, LLP

(57) ABSTRACT

Various aspects of the present disclosure generally relate to certificate based application descriptors for network slice selection. In some aspects, a user equipment (UE) may receive a first certificate associated with obtaining a network slice for executing an application. The UE may transmit, to a device, a request for the network slice with the first certificate, and receive an indication that the network slice is available to the UE for the application, based at least in part on the request. Numerous other aspects are provided.

25 Claims, 12 Drawing Sheets

(58) Field of Classification Search
USPC .......................................................... 455/410
See application file for complete search history.

(56) References Cited

U.S. PATENT DOCUMENTS

| 2018/0191782 | A1  | 7/2018  | Djordjevic et al. |           |
|--------------|-----|---------|-------------------|-----------|
| 2018/0359241 | A1  | 12/2018 | Brockhaus et al.  |           |
| 2019/0274041 | A1  | 9/2019  | Xu et al.         |           |
| 2020/0351653 | A1* | 11/2020 | Khan ............. | H04W 12/35 |

OTHER PUBLICATIONS

International Search Report and Written Opinion—PCT/CN2020/074268—ISA/EPO—Oct. 28, 2020.
Nokia, et al., "On PDCCH Enhancements for NR URLLC", 3GPP TSG RAN WG1#98bis, R1-1910798, Chongqing, China, Oct. 14-20, 2019, 25 Pages, Section 2.
3GPP TR 33.899: "3rd Generation Partnership Project, Technical Specification Group Services and System Aspects, Study on the Security Aspects of the Next Generation System (Release 14)", 3GPP Standard, Technical Report, V1.0.0 (Mar. 2017), 3GPP, Mobile Competence Centre, 650, Route Des Lucioles, F-06921 Sophia-Antipolis Cedex, France, vol. SA WG3, No. V1.0.0, Mar. 9, 2017, pp. 1-471, XP051290424, Chapter 5.8—network slicing security.
Supplementary Partial European Search Report - EP20917637 - Search Authority - MUNICH - 2023-09-18 (202104EP).

\* cited by examiner

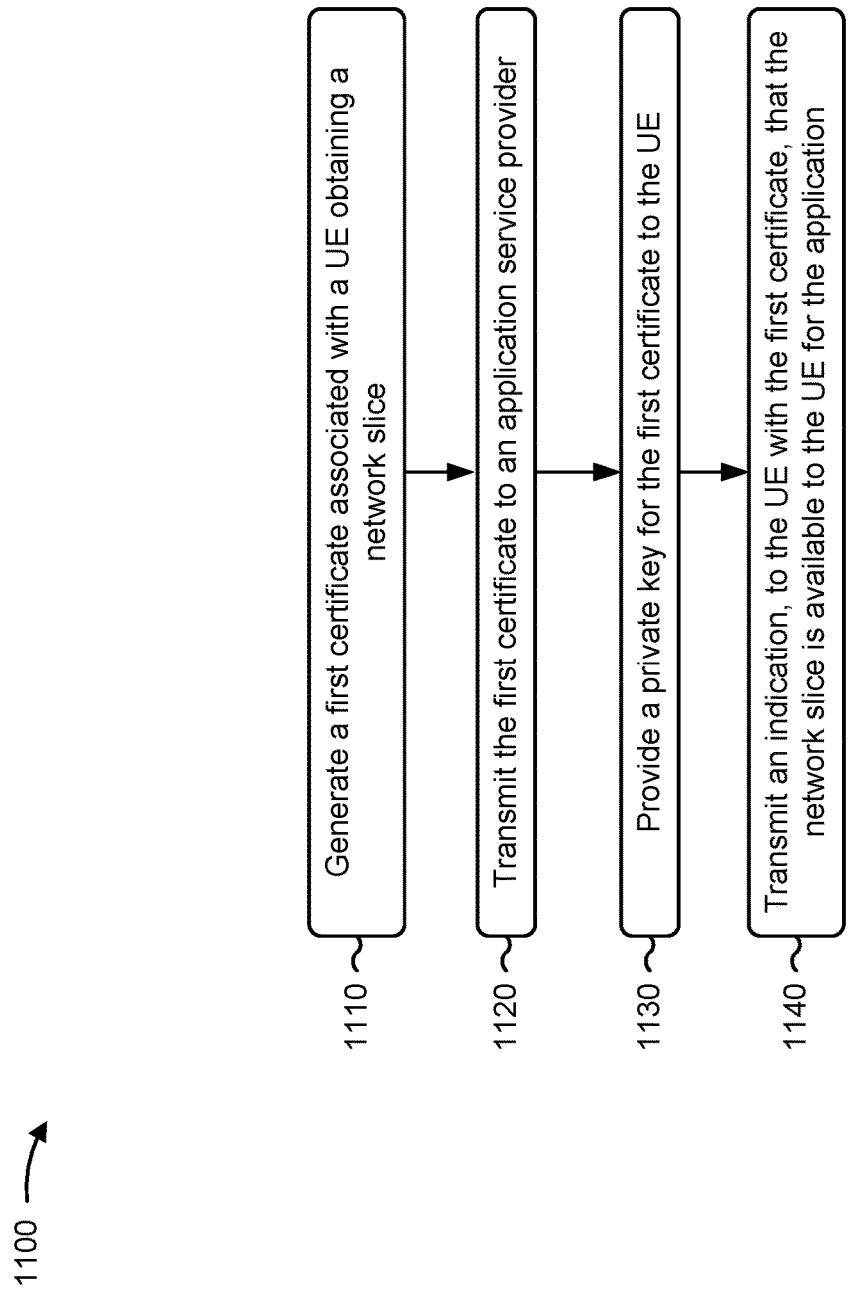

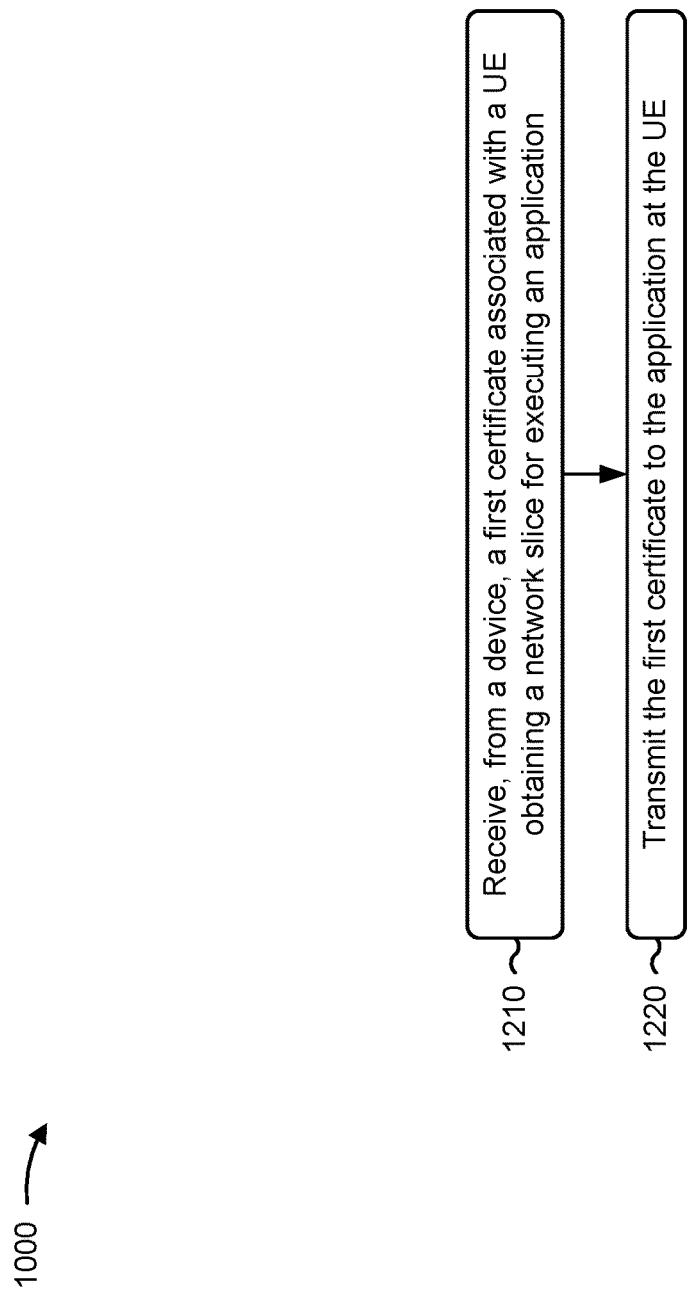

CERTIFICATE BASED APPLICATION DESCRIPTORS FOR NETWORK SLICE SELECTION

CROSS-REFERENCE TO RELATED APPLICATION

This application is a 371 national stage of PCT Application No. PCT/CN2020/074268 filed on Feb. 4, 2020, entitled "CERTIFICATE BASED APPLICATION DESCRIPTORS FOR NETWORK SLICE SELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for certificate based application descriptors for network slice selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include receiving a first certificate associated with obtaining a network slice for executing an application. The method may include transmitting, to a device, a request for the network slice with the first certificate, and receiving an indication that the network slice is available to the UE for the application, based at least in part on the request.

In some aspects, a method of wireless communication, performed by a device, may include receiving, from a UE, a request for a network slice for executing an application, where the request includes a first certificate associated with obtaining the network slice. The method may include transmitting the first certificate to an application service provider for validation, and transmitting an indication to the UE that the network slice is available to the UE based at least in part on the validation.

In some aspects, a method of wireless communication, performed by an application service provider, may include transmitting, to a UE, a first certificate associated with the UE obtaining a network slice for executing an application, and receiving, from a device, the first certificate and a request for a second certificate of the device associated with the application. The method may include transmitting the second certificate to the device based at least in part on a determination that the first certificate is valid.

In some aspects, a method of wireless communication, performed by a device, may include generating a first certificate associated with a UE obtaining a network slice, transmitting the first certificate to an application service provider, and providing a private key for the first certificate to the UE. The method may include transmitting an indication, to the UE with the first certificate, that the network slice is available to the UE for the application.

In some aspects, a method of wireless communication, performed by an application service provider, may include receiving, from a device, a first certificate associated with a UE obtaining a network slice for executing an application, and transmitting the first certificate to the application at the UE.

In some aspects, a UE for wireless communication may include memory and one or more processors operatively coupled to the memory. The memory and the one or more processors may be configured to receive a first certificate associated with obtaining a network slice for executing an application. The memory and the one or more processors may be configured to transmit, to a device, a request for the network slice with the first certificate, and receive an indication that the network slice is available to the UE for the application, based at least in part on the request.

In some aspects, a device for wireless communication may include memory and one or more processors operatively coupled to the memory. The memory and the one or more processors may be configured to receive, from a UE, a request for a network slice for executing an application, where the request includes a first certificate associated with obtaining the network slice, and transmit the first certificate to an application service provider for validation. The memory and the one or more processors may be configured to transmit an indication to the UE that the network slice is available to the UE based at least in part on the validation.

In some aspects, an application service provider for wireless communication may include memory and one or more processors operatively coupled to the memory. The memory and the one or more processors may be configured to transmit, to a UE, a first certificate associated with the UE obtaining a network slice for executing an application. The memory and the one or more processors may be configured to receive, from a device, the first certificate and a request for a second certificate of the device associated with the application, and transmit the second certificate to the device based at least in part on a determination that the first certificate is valid.

In some aspects, a device for wireless communication may include memory and one or more processors operatively coupled to the memory. The memory and the one or more processors may be configured to generate a first certificate associated with a UE obtaining a network slice and transmit the first certificate to an application service provider. The memory and the one or more processors may be configured to provide a private key for the first certificate to the UE, and transmit an indication, to the UE with the first certificate, that the network slice is available to the UE for the application.

In some aspects, an application service provider for wireless communication may include memory and one or more processors operatively coupled to the memory. The memory and the one or more processors may be configured to receive, from a device, a first certificate associated with a UE obtaining a network slice for executing an application, and transmit the first certificate to the application at the UE.

In some aspects, a non-transitory computer-readable medium may store one or more instructions for wireless communication. The one or more instructions, when executed by one or more processors of a UE, may cause the one or more processors to receive a first certificate associated with obtaining a network slice for executing an application, transmit, to a device, a request for the network slice with the first certificate, and receive an indication that the network slice is available to the UE for the application, based at least in part on the request.

In some aspects, a non-transitory computer-readable medium may store one or more instructions for wireless communication. The one or more instructions, when executed by one or more processors of a device, may cause the one or more processors to receive, from a UE, a request for a network slice for executing an application, where the request includes a first certificate associated with obtaining the network slice, transmit the first certificate to an application service provider for validation, and transmit an indication to the UE that the network slice is available to the UE based at least in part on the validation.

In some aspects, a non-transitory computer-readable medium may store one or more instructions for wireless communication. The one or more instructions, when executed by one or more processors of an application service provider, may cause the one or more processors to transmit, to a UE, a first certificate associated with the UE obtaining a network slice for executing an application, receive, from a device, the first certificate and a request for a second certificate of the device associated with the application, and transmit the second certificate to the device based at least in part on a determination that the first certificate is valid.

In some aspects, a non-transitory computer-readable medium may store one or more instructions for wireless communication. The one or more instructions, when executed by one or more processors of a device, may cause the one or more processors to: generate a first certificate associated with a UE obtaining a network slice, transmit the first certificate to an application service provider, provide a private key for the first certificate to the UE, and transmit an indication, to the UE with the first certificate, that the network slice is available to the UE for the application.

In some aspects, a non-transitory computer-readable medium may store one or more instructions for wireless communication. The one or more instructions, when executed by one or more processors of an application service provider, may cause the one or more processors to receive, from a device, a first certificate associated with a UE obtaining a network slice for executing an application, and transmit the first certificate to the application at the UE.

In some aspects, an apparatus for wireless communication may include means for receiving a first certificate associated with obtaining a network slice for executing an application, means for transmitting, to a device, a request for the network slice with the first certificate, and means for receiving an indication that the network slice is available to the apparatus for the application, based at least in part on the request.

In some aspects, an apparatus for wireless communication may include means for receiving, from a UE, a request for a network slice for executing an application, where the request includes a first certificate associated with obtaining the network slice, means for transmitting the first certificate to an application service provider for validation, and means for transmitting an indication to the UE that the network slice is available to the UE based at least in part on the validation.

In some aspects, an apparatus for wireless communication may include means for transmitting, to a UE, a first certificate associated with the UE obtaining a network slice for executing an application, means for receiving, from a device, the first certificate and a request for a second certificate of the device associated with the application, and means for transmitting the second certificate to the device based at least in part on a determination that the first certificate is valid.

In some aspects, an apparatus for wireless communication may include means for generating a first certificate associated with a UE obtaining a network slice, means for transmitting the first certificate to an application service provider, means for providing a private key for the first certificate to the UE, and means for transmitting an indication, to the UE with the first certificate, that the network slice is available to the UE for the application.

In some aspects, an apparatus for wireless communication may include means for receiving, from a device, a first certificate associated with a UE obtaining a network slice for executing an application, and means for transmitting the first certificate to the application at the UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a device, in accordance with various aspects of the present disclosure.

FIG. 12 is a diagram illustrating an example process performed, for example, by an ASP, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
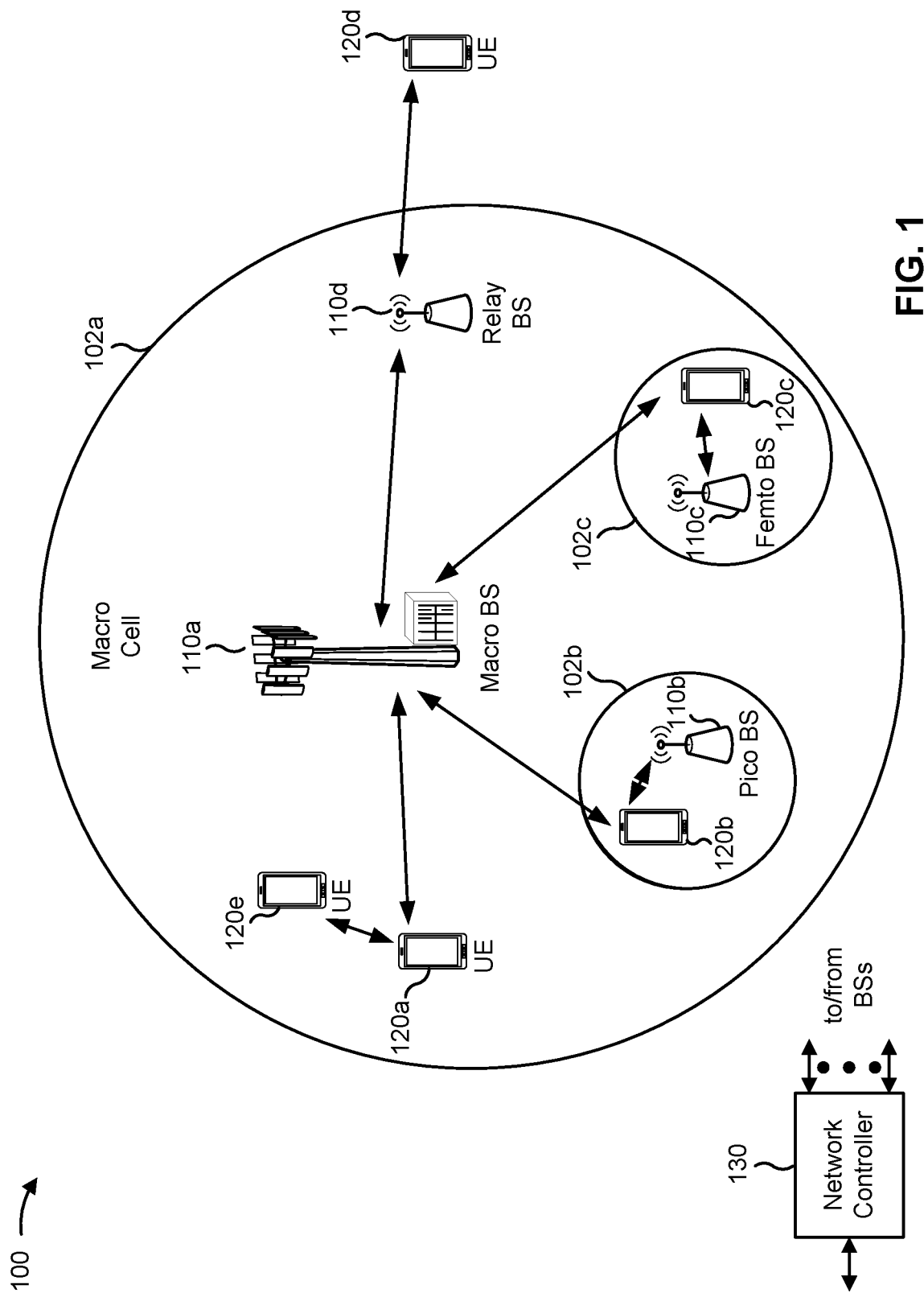
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
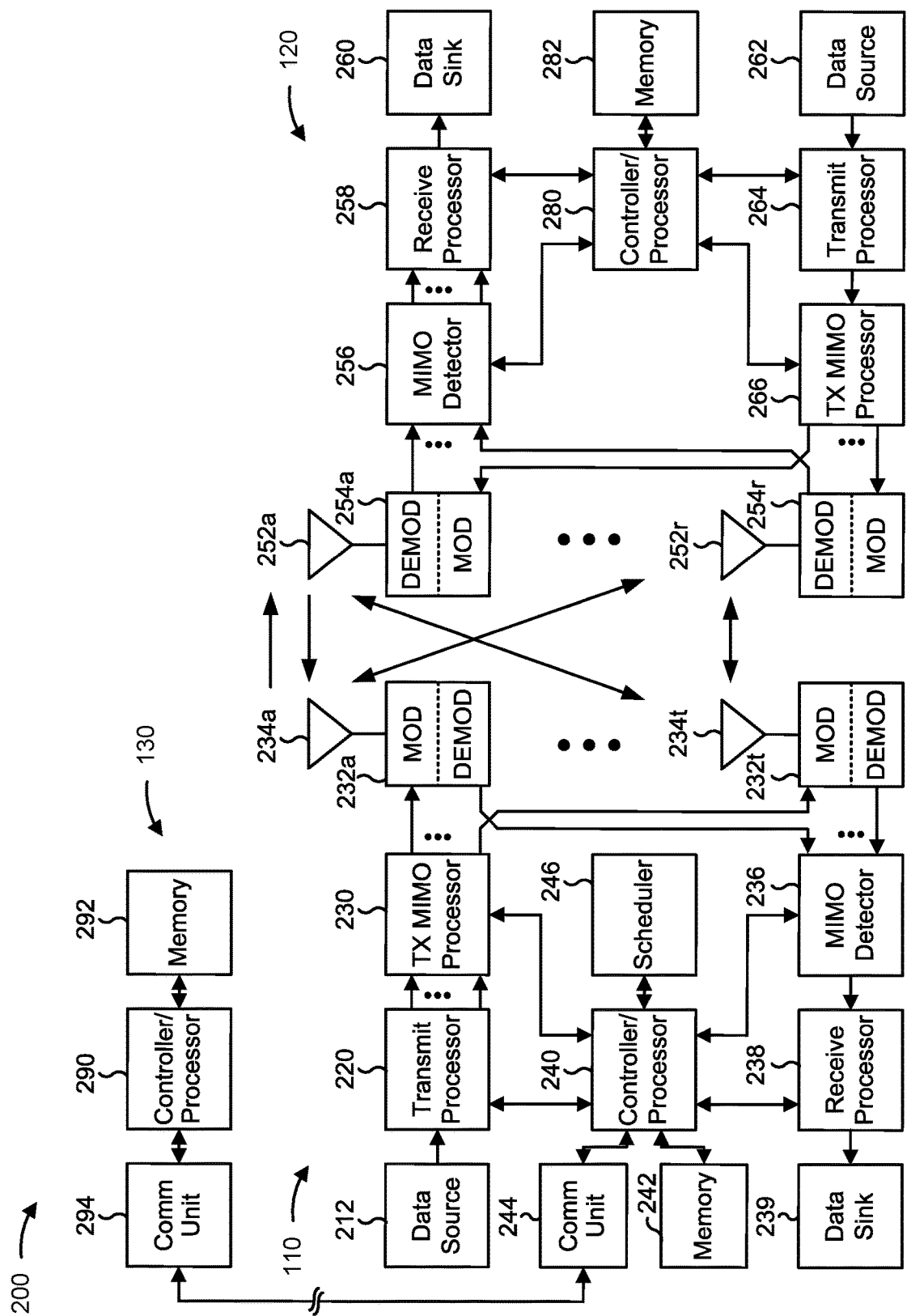
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with certificate based application descriptors for network slice selection, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. A scheduler 246 may schedule UEs for data transmission on the downlink and/or uplink.

In some aspects, a device hosting a network entity, such as a 5G core function, or an application server on a data network may include components such as shown for network controller 130 in FIG. 2. One or more instructions, when executed by one or more processors of a network entity, may perform or direct operations of, for example, process 800 of FIG. 8, process 900 of FIG. 9, process 1000 of FIG. 10, process 1100 of FIG. 11, process 1200 of FIG. 12, and/or other processes as described herein.

In some aspects, UE 120 may include means for receiving a first certificate associated with obtaining a network slice for executing an application, means for transmitting, to a device, a request for the network slice with the first certificate, means for receiving an indication that the network slice is available to the UE for the application, based at least in part on the request, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a device, such as one or more of a mobile network operator (MNO), an access and mobility management function (AMF), or a policy and control function (PCF), may include means for receiving, from a UE, a request for a network slice for executing an application, where the request includes a first certificate associated with obtaining the network slice, means for transmitting the first certificate to an application service provider for validation, means for transmitting an indication to the UE that the network slice is available to the UE based at least in part on the validation, and/or the like. In some aspects, such means may include one or more components described in connection with FIG. 2, such as communication unit 294, controller/processor 290, memory 292, and/or the like.

In some aspects, an application service provider may include means for transmitting, to a UE, a first certificate associated with the UE obtaining a network slice for executing an application, means for receiving, from a device, the first certificate and a request for a second certificate of the device associated with the application, means for transmitting the second certificate to the device based at least in part on a determination that the first certificate is valid, and/or the like. In some aspects, such means may include one or more components described in connection with FIG. 2, such as communication unit 294, controller/processor 290, memory 292, and/or the like.

In some aspects, a device, such as one or more of an MNO, an AMF, or a PCF, may include means for generating a first certificate associated with a UE obtaining a network slice, means for transmitting the first certificate to an application service provider, means for providing a private key for the first certificate to the UE, means for transmitting an indication, to the UE with the first certificate, that the network slice is available to the UE for the application, and/or the like. In some aspects, such means may include one or more components described in connection with FIG. 2, such as communication unit 294, controller/processor 290, memory 292, and/or the like.

In some aspects, an application service provider may include means for receiving, from a device, a first certificate associated with a UE obtaining a network slice for executing an application, means for transmitting the first certificate to the application at the UE, and/or the like. In some aspects, such means may include one or more components described in connection with FIG. 2, such as communication unit 294, controller/processor 290, memory 292, and/or the like.

As indicated above, FIG. 2 is provided as an example. Other examples may differ from what is described with regard to FIG. 2.

Figure 3:
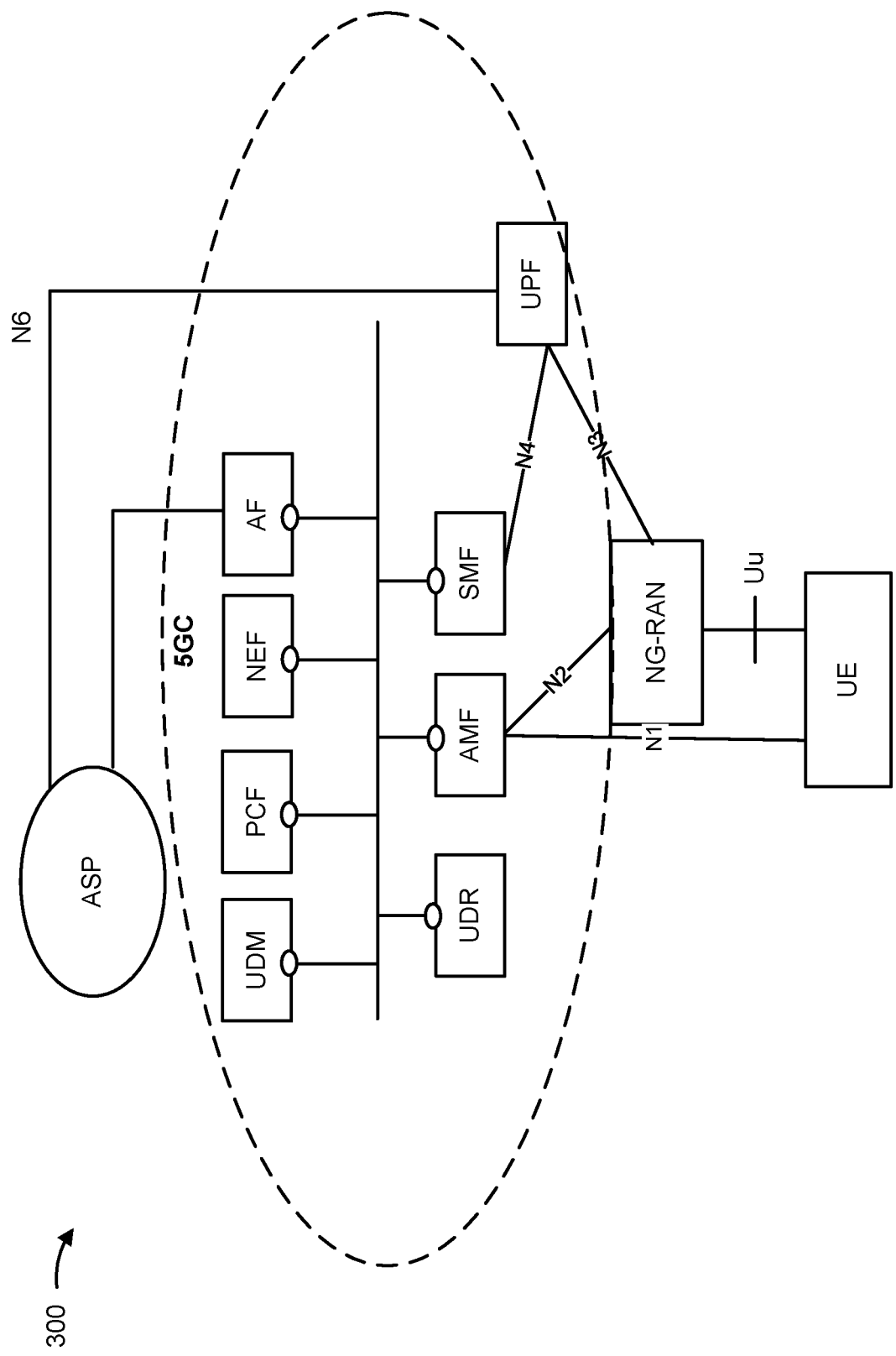
FIG. 3 illustrates an example of a 5G architecture with respect to an application server and a UE.

FIG. 3 illustrates an example 300 of a 5G architecture with respect to an application server and a UE.

The 5G architecture may include a next generation radio access network (NG-RAN), which may include one or more base stations, such as base station 110, that communicated with a UE, such as UE 120, over a Uu interface. The Uu interface is a radio interface between the UE and the NG-RAN. The 5G architecture may include a core network (5GC) that provides communications between the NG-RAN and the outside world, including application servers of companies that may provide data and services to the UE through applications on the UE.

The 5GC may include a unified data management (UDM) entity that makes relevant data available to an access and management (AMF) entity and a session management function (SMF) entity. The AMF entity manages UE network registration, manages mobility, and maintains a non-access stratum (NAS) signaling connection with the UE, and manages a registration procedure of the UE with a network. The SMF entity manages sessions and allocates internet protocol (IP) addresses to the UE. The 5GC includes a user plane function (UPF) entity that manages user traffic to and from the UE through the NG-RAN and enforces a quality of service (QoS). The 5GC includes a policy control function (PCF) entity that implements charging rules and flow control rules, and manages traffic priority and a QoS for user subscription services. The 5GC may include a unified data repository (UDR) entity that stores structured data for exposure to network functions and a network exposure function (NEF) entity that securely exposes services and capabilities provided by 3GPP network functions. The 5GC also includes an application function (AF) entity that supports application functionality from an application service provider (ASP), influences traffic routing, and interacts with the PCF entity.

As indicated above, FIG. 3 is provided as an example. Other examples may differ from what is described with regard to FIG. 3.

Many applications for UEs require a communication channel to reach an associated cloud server or edge server, in order to obtain service for the application from an ASP. Such applications may be referred to as network applications, or Net Apps. 5G can provide a network slice to an application for communication. Network slicing is an architecture that enables multiplexing of virtual and independent logical networks on the same physical network infrastructure. Each network slice is an isolated end-to-end network configured to satisfy requirements requested by a particular application. The UE, using a modem of the UE, may select a protocol data unit (PDU) session associated with a network slice for the application. A UE may select the PDU session according to a UE route selection policy (URSP). The URSP may be preconfigured or signaled from a PCF entity to a UE via NAS signaling and/or via an AMF entity.

An application executing on a UE may obtain services from various cloud servers or edge servers, and this additional flexibility may be advantageous if there are secure methods for identifying and correlating the application to a network slice. One proposal for identification of an application for a network slice is to use an OSAPPId, but this concept has not been developed. If a UE does not have a secure method for identifying a network slice for an application, the UE may waste resources working around or remedying any security issues. Some security may be provided by the AMF entity, but this is a signaling and processing burden for the AMF entity when there are many UEs and various applications involved.

According to various aspects described herein, a digital certificate may be used to identify an application for a network slice. This certificate may be referred to as a slice certificate. A UE may use the slice certificate to facilitate selection of a network slice for the application. In some aspects, an ASP may manage the slice certificate for the application, providing an extra layer of security. Furthermore, by having the ASP manage and validate the slice certificate, there is less of a signaling and processing burden on the AMF entity. The AMF entity and the ASP may use a certificate to validate their relationship.

Alternatively, in some aspects, a device for an MNO may generate and manage the slice certificate. While the MNO may generate the slice certificate, the MNO may provide the slice certificate to the ASP for distribution. This may be provided via an NEF entity or an AF entity. The MNO may use a slice certificate signature to securely make a network slice available to the application at the UE. By providing this extra security, a UE may obtain access to a network slice and save signaling and processing resources that may be wasted on working around or remedying security issues. The MNO may communicate with the UE via NAS signaling through an AMF entity or one or more network functions, which may be performed by the device that operates the MNO or interfaces with the MNO.

Figure 4:
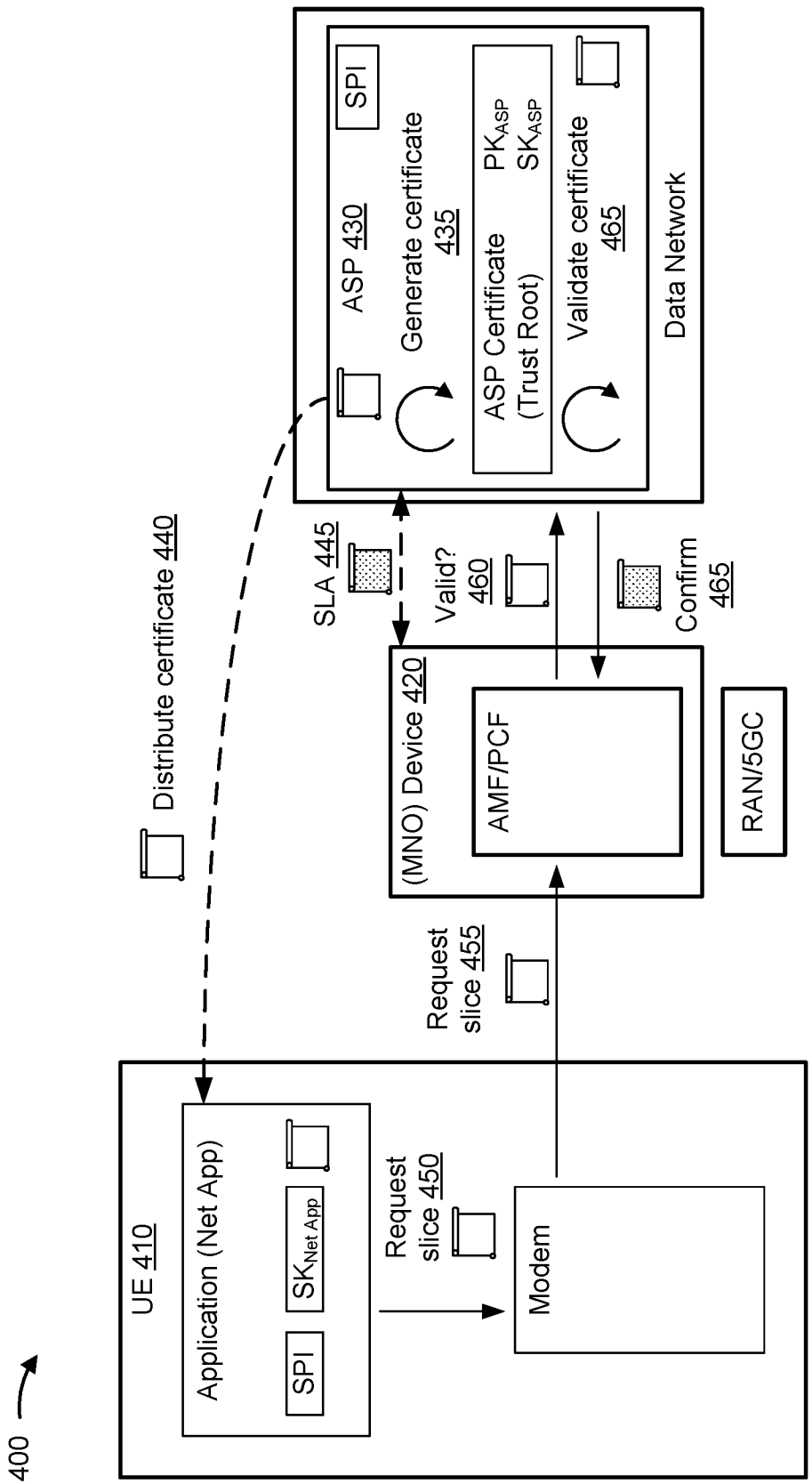
FIGS. 4 and 5 illustrate an example of a certificate based application descriptor for network slice selection that is managed by an application service provider (ASP), in accordance with various aspects of the present disclosure.
Figure 5:
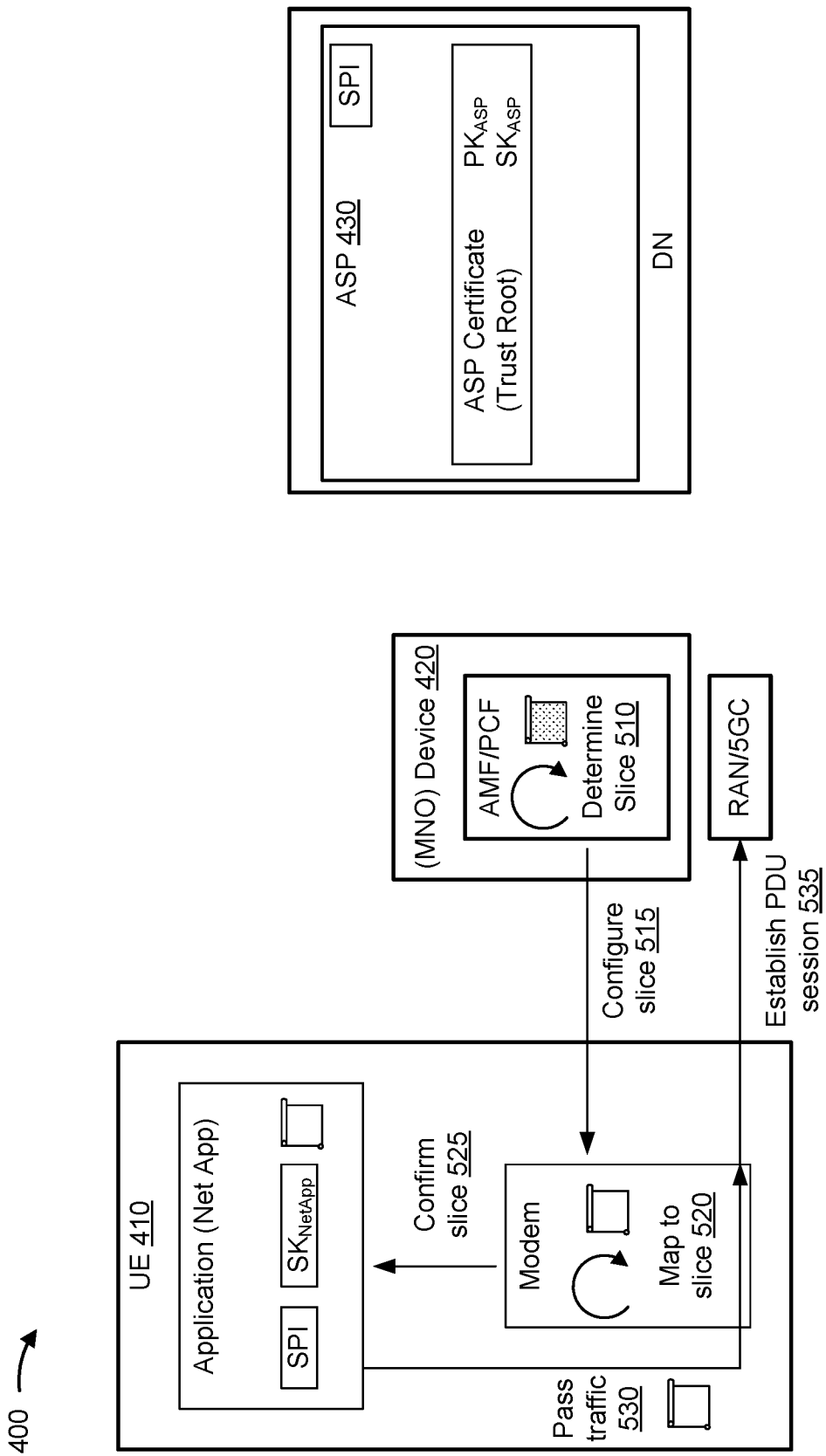

FIGS. 4 and 5 illustrate an example 400 of a certificate based application descriptor for network slice selection that may be managed by an ASP, in accordance with various aspects of the present disclosure. FIGS. 4 and 5 illustrate a UE 410 that is configured to execute an application, and a device 420 that may be operated by a mobile network operator (MNO). An ASP 430 may reside in an application server or a data network and provide services to the application on behalf of a third-party (e.g., social media application company, telecommunications company, gaming company, products company, services company, and/or the like).

As shown by reference number 435, as part of a preconfiguration procedure, ASP 430 may generate a certificate for a network slice as a certificate based application descriptor. This certificate may be referred to as a slice certificate. ASP 430 may act as a trust center and/or have a trust root for the slice certificate. ASP 430 may be or may coordinate with a certificate authority for the slice certificate. As shown by reference number 440, ASP 430 may provide the slice certificate to the application, which resides at UE 410. ASP 430 may provide public key infrastructure (PKI) keys of the slice certificate to the application at the UE. The keys may include a public key (e.g., $PK_{Net\ App}$) and a private key (e.g., $SK_{Net\ App}$) for the slice certificate. The private key may be provided securely, and may not be transmitted online. ASP 430 may sign the slice certificate with a private key for ASP 430 (e.g., $SK_{ASP}$), for verification that the slice certificate is from ASP 430. ASP 430 may have other specified information to use for verification and signature generation. This other specified information may be referred to as a small piece of information (SPI), and ASP 430 may embed the SPI in the application. The SPI may be secret data. As a result of the preconfiguration procedure, the application at UE 410 may have the slice certificate (signed with a private key for ASP 430), the public key for the slice certificate, the private key for the slice certificate, and the SPI.

In some aspects, another preconfiguration procedure may include establishing a certificate between the MNO at device 420 and ASP 430. The MNO at device 420 may have a service level agreement (SLA) or a contract with ASP 430, and the certificate representing the SLA may be referred to as an SLA certificate. The MNO may generate the SLA certificate and provide it to ASP 430, as shown by reference number 445. ASP 430 may use the SLA certificate to validate or confirm the slice certificate for device 420. In some aspects, ASP 430 and the MNO may use other data or methods to identify the SLA.

During registration of UE 410 to a 5GC, UE 410 may transmit a registration request to a PCF entity at device 420. The PCF entity may provide UE policy information, such as a URSP to UE 410.

At some future time, upon initial communication with ASP 430, the application at UE 410 may request a network slice on which the application may execute and by which the application may communicate. As shown by reference number 450, the application may transmit a request for the network slice. The application, via UE 410, may generate a slice signature by encrypting a private key of the application, the SPI, and/or a timestamp (e.g., current timestamp). The request may include the slice signature, the timestamp, and the slice certificate. A modem of UE 410 may receive the request. As shown by reference number 455, the modem may transmit the request to device 420, where the AMF entity may pass the request to the PCF entity.

As shown by reference number 460, device 420 may seek to validate the slice certificate in the request. Rather than validating the slice certificate itself, device 420, via the PCF entity, may transmit the slice certificate, the timestamp, the slice signature, and/or the SLA certificate to ASP 430. As shown by reference number 465, ASP 430 may validate the slice signature and confirm that the slice certificate may take advantage of the SLA or contract between device 420 and ASP 430. In some aspects, ASP 430 may confirm validation of the slice certificate by transmitting the SLA certificate, or some other confirmation, to device 420.

As shown by FIG. 5, and by reference number 510, device 420, via the AMF entity, may determine the network slice for the application to use based at least in part on receiving the SLA certificate, or some other confirmation from ASP 430. As shown by reference number 515, device 420 may configure or update the URSP of UE 410 with an indication that the slice certificate is associated with the network slice. The AMF entity may update the URSP via single network slice selection assistance information (S-NSSAI). The indication may also or alternatively be made with other NAS signaling.

As shown by reference number 520, the modem of UE 410 may map the application holding the slice certificate to the network slice. As shown by reference number 525, the modem may confirm selection of the network slice to the application. The modem may provide a token to the application that the application can use in a following transaction between the application and the modem.

As shown by reference number 530, the application may pass data or other traffic to the modem with the slice certificate. The application may pass the token received from the modem, and the modem may use the token to securely map applications to network slices. As shown by reference number 535, UE 410 may transmit the traffic from the application via the S-NSSAI, and establish a PDU session with a 5G radio access network (RAN) and the 5GC.

In sum, FIG. 4 shows new preconfiguration procedures for setting up a trust relationship between an ASP, an MNO, and a UE. The UE and the ASP may use a PKI certificate based application identifier for network slice selection. The ASP may assist the MNO with selecting a slice for the application and with authenticating an identity of the application. The ASP may also dynamically confirm or control the use of the network slice by the application. As a result, the UE may take advantage of the extra security, and the MNO may save resources by passing a slice certificate validation burden to the ASP. The procedures depicted in FIGS. 4 and 5 may allow a UE, an MNO, and an ASP to leverage an existing application distribution chain. The ASP may be involved in the dynamic slice allocation process and may encourage the ASP to promote a network slice and provide more flexibility. In some aspects, the ASP may collect statistical data on slice usage, and provide the data upon request or use the statistical data internally to improve service to the application.

As indicated above, FIGS. 4 and 5 are provided as an example. Other examples may differ from what is described with regard to FIGS. 4 and 5.

Figure 6:
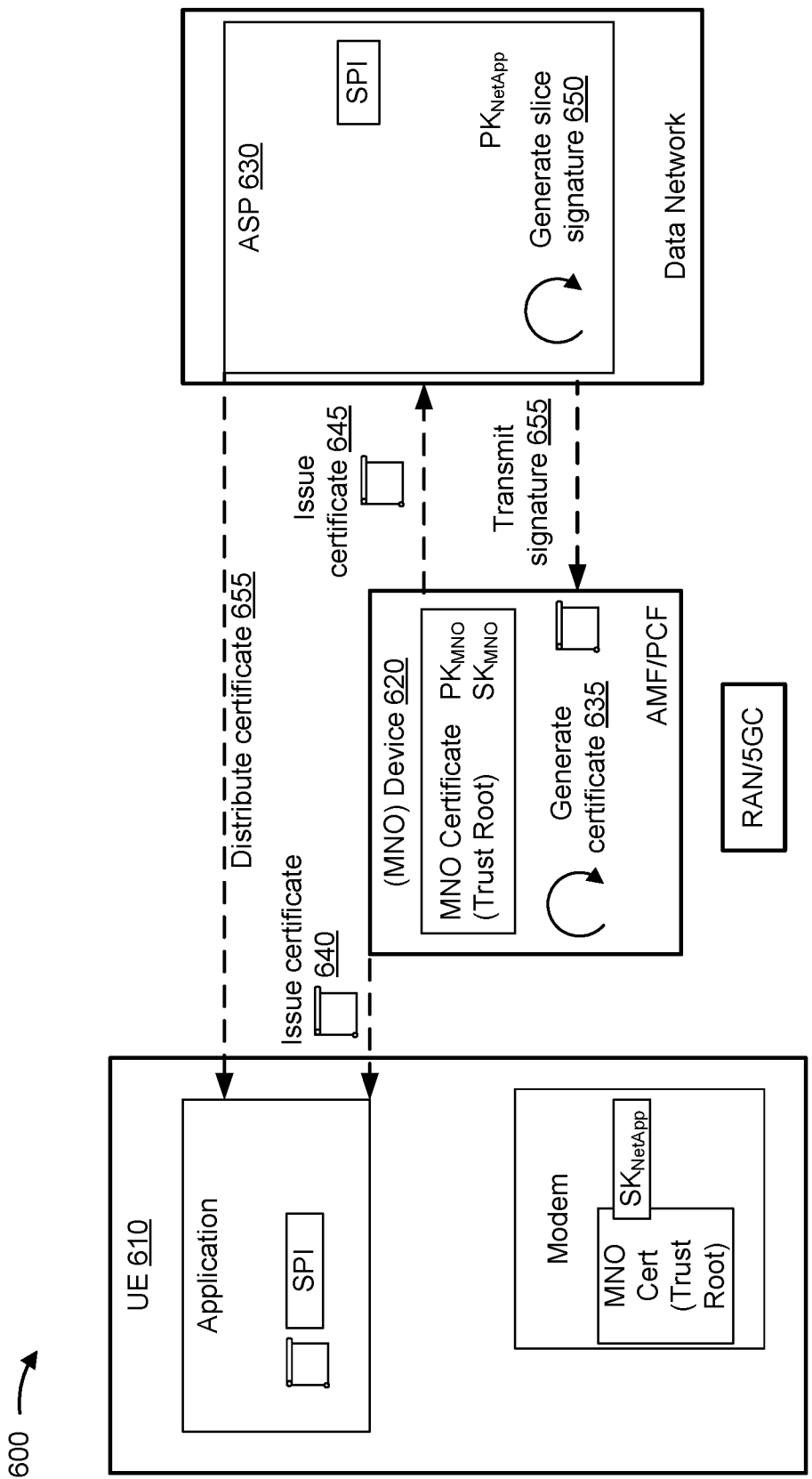
FIGS. 6 and 7 illustrate an example of a certificate based application descriptor for network slice selection that is managed by a mobile network operator, in accordance with various aspects of the present disclosure.
Figure 7:
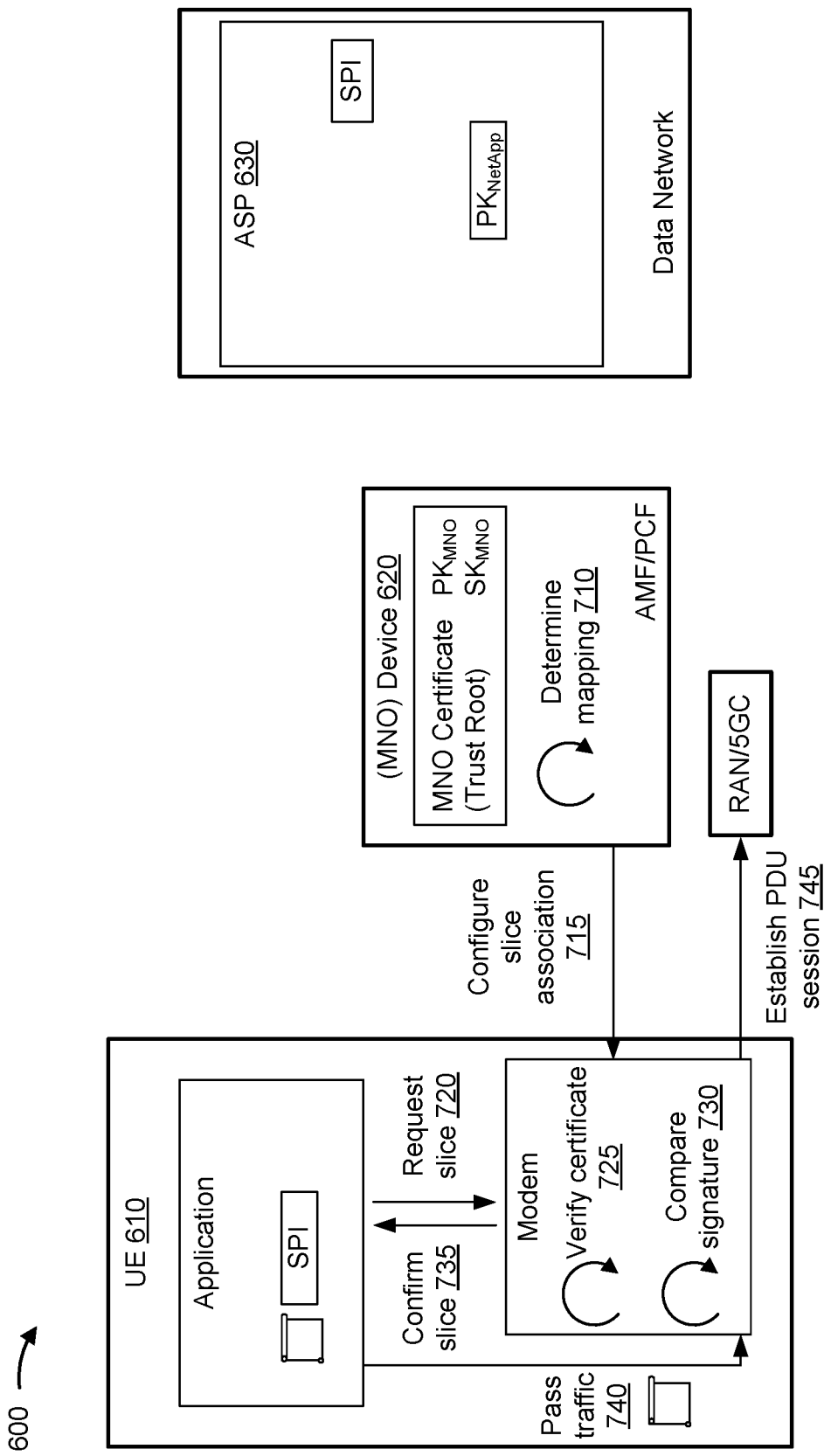

FIGS. 6 and 7 illustrate an example 600 of a certificate based application descriptor for network slice selection that may be managed by an MNO, in accordance with various aspects of the present disclosure. FIGS. 6 and 7 illustrate a UE 610 that may be configured to execute an application, and a device 620 that may be operated by the MNO. An ASP 630 may reside in a data network and provide services to the application.

As shown by reference number 635, as part of a preconfiguration procedure, device 620 may generate a slice certificate for a network slice that the application may use to execute an application. As shown by reference number 640, device 620 may issue the slice certificate to the application at UE 610. Device 620 may provide a root key and a private key for the application to UE 610.

The MNO and ASP 630 may have an SLA or a contract for the application, which may be represented by an SLA certificate. As shown by reference number 645, device 620 for the MNO may transmit the slice certificate, signed with a private key of the application, to ASP 630 for distribution to UE 610. The MNO may also preconfigure a root key to verify the slice certificate. As shown by reference number 650, ASP 630 may generate a slice signature by encrypting the private key of the application and/or SPI stored at ASP 630 (and embedded in the application). ASP 630 may treat the slice certificate and the SPI as part of application code, and may guarantee that the code is not changed and the SPI is not stolen. As shown by reference number 655, ASP 630 may transmit the slice signature to device 620.

As shown in FIG. 7, and by reference number 710, device 620 may determine a mapping between network slices and respective slice signatures. For example, a first network slice may correspond to a first respective slice signature generated by ASP 630, and a second network slice may correspond to a second respective slice signature. As shown by reference number 715, the MNO may configure UE 610 to associate slice certificates and slice signatures with S-NSSAI. The MNO may update the URSP of UE 610. The MNO may provide the root key to a modem of UE 610.

As shown by reference number 720, the application may pass a request for a network slice for the application to the modem. The request may include the slice certificate and a slice signature. As shown by reference number 725, the modem may verify the slice certificate using the root key. For example, the modem may generate a copy of the slice certificate using the root key and determine if the slice certificate matches the copy of the slice certificate. The modem may alternatively decrypt the slice certificate using the root key to determine if the slice certificate matches a slice certificate stored at the modem. As shown by reference number 730, the modem may determine the slice signature from the application using the private key of the application. For example, the modem may generate a copy of the slice signature using the private key for the application and determine if the slice signature matches the copy of the slice signature. The modem may alternatively decrypt the slice signature with the private key to determine if the slice signature matches a decrypted slice signature stored at the modem. The modem may compare the slice signature and a list of the URSP, which may list signatures or slices according to a priority level. If the modem determines that there is a match, the modem may select the network slice that matches the signature. As shown by reference number 735, the modem may confirm the network slice that is selected to the application.

As shown by reference number 740, the application may pass data or other traffic to the modem with the slice certificate. As shown by reference number 745, UE 610 may transmit the traffic from the application via the S-NSSAI and establish a PDU session with a 5G RAN and the 5GC. The procedures depicted in FIGS. 6 and 7 allow the MNO to manage and control the applications that want to use a network slice. The procedures may also provide for UE 610 to authenticate network slice requests from the application, in a more UE-centric approach.

As indicated above, FIGS. 6 and 7 are provided as an example. Other examples may differ from what is described with regard to FIGS. 6 and 7.

Figure 8:
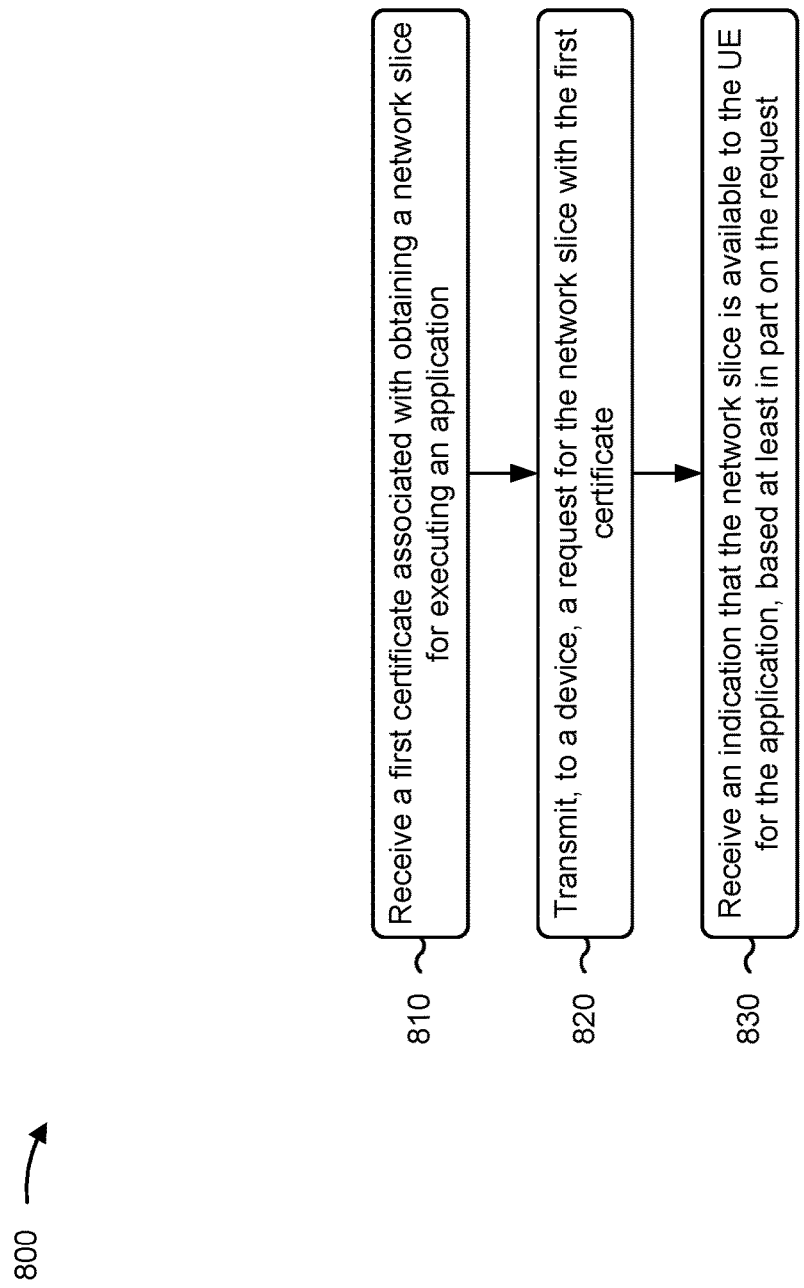
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted in FIGS. 1 and 2, UE 410 depicted in FIGS. 4 and 5, UE 610 depicted in FIGS. 6 and 7, and/or the like) performs operations associated with certificate based application descriptors for network slice selection.

As shown in FIG. 8, in some aspects, process 800 may include receiving a first certificate associated with obtaining a network slice for executing an application (block 810). For example, the UE (e.g., using receive processor 258, transmit processor 264, controller/processor 280, memory 282, and/or the like) may receive a first certificate associated with obtaining a network slice for executing an application, as described above.

As further shown in FIG. 8, in some aspects, process 800 may include transmitting, to a device, a request for the network slice with the first certificate (block 820). For example, the UE (e.g., using receive processor 258, transmit processor 264, controller/processor 280, memory 282, and/or the like) may transmit, to a device, a request for the network slice with the first certificate, as described above.

As further shown in FIG. 8, in some aspects, process 800 may include receiving an indication that the network slice is available to the UE for the application, based at least in part on the request (block 830). For example, the UE (e.g., using receive processor 258, transmit processor 264, controller/processor 280, memory 282, and/or the like) may receive an indication that the network slice is available to the UE for the application, based at least in part on the request, as described above.

Process 800 may include additional aspects, such as any single aspect or any combination of aspects described below and/or in connection with one or more other processes described elsewhere herein.

In a first aspect, the device is one or more of a mobile network operator, an access and mobility management function, or a policy and control function.

In a second aspect, alone or in combination with the first aspect, the first certificate is received from an application service provider that has secret data of the application, the application has permission from the device to use the network slice.

In a third aspect, alone or in combination with one or more of the first and second aspects, the application has the secret data and receives the first certificate.

In a fourth aspect, alone or in combination with one or more of the first through third aspects, the request includes a timestamp and a signature generated by encrypting the secret data and the timestamp with a private key for the first certificate.

In a fifth aspect, alone or in combination with one or more of the first through fourth aspects, process 800 includes generating the signature by encrypting the secret data and the timestamp with a public key for the first certificate.

In a sixth aspect, alone or in combination with one or more of the first through fifth aspects, process 800 includes establishing a protocol data unit session based at least in part on the first certificate.

In a seventh aspect, alone or in combination with one or more of the first through sixth aspects, process 800 includes determining whether to transmit the request for the network slice based at least in part on statistics associated with the application.

In an eighth aspect, alone or in combination with one or more of the first through seventh aspects, process 800 includes mapping the application to the network slice.

In a ninth aspect, alone or in combination with one or more of the first through eighth aspects, process 800 includes notifying, by a modem of the UE, the application of the network slice.

In a tenth aspect, alone or in combination with one or more of the first through ninth aspects, the first certificate is received from the device, and the device is an access and mobility management function entity.

In an eleventh aspect, alone or in combination with one or more of the first through tenth aspects, the application receives the first certificate from an application service provider and provides the first certificate to a modem of the UE in association with a request for the network slice, and process 800 further comprises validating, at the modem of the UE, the first certificate from the application on the UE with the first certificate received from the device.

In a twelfth aspect, alone or in combination with one or more of the first through eleventh aspects, the application receives the first certificate from an application service provider and provides the first certificate to a modem of the UE in association with a request for the network slice, and process 800 further comprises validating, at the modem of the UE, a signature from the application on the UE with a signature in a UE route selection policy.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
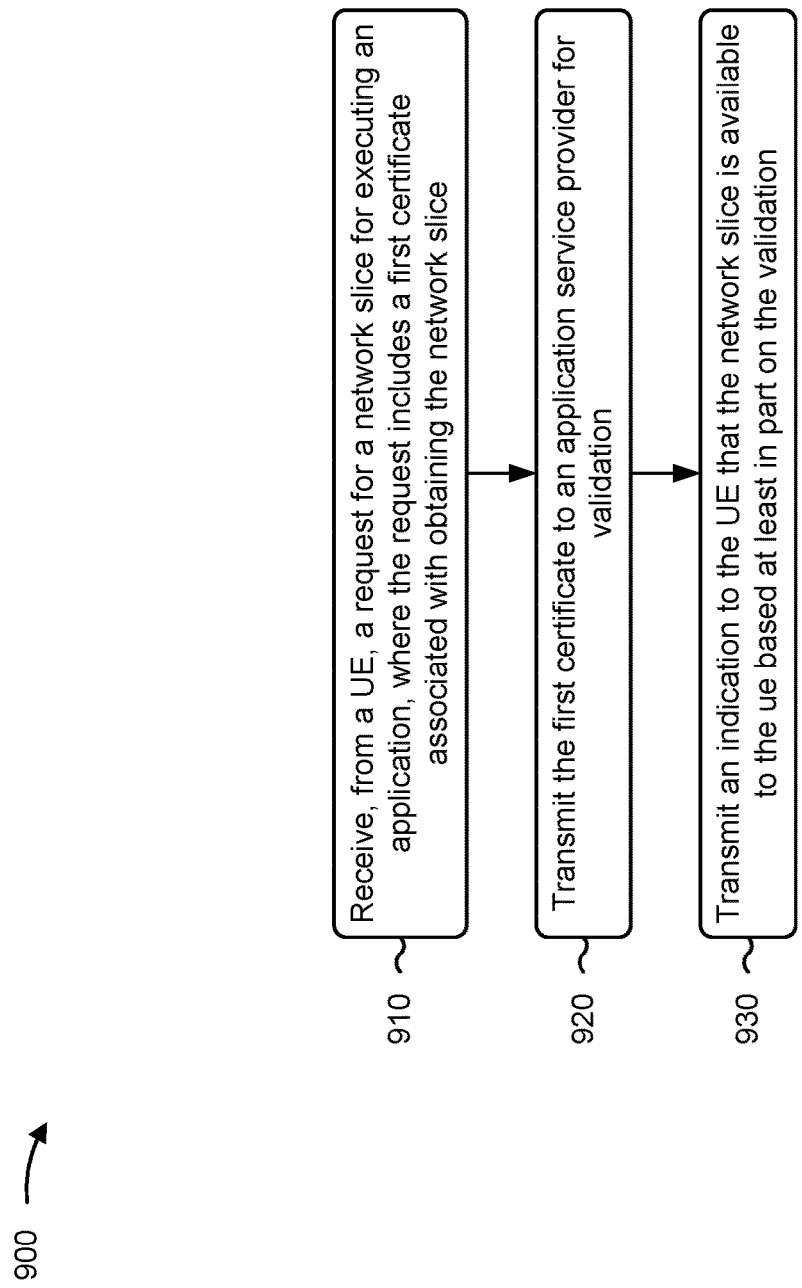
FIG. 9 is a diagram illustrating an example process performed, for example, by a device, in accordance with various aspects of the present disclosure.

FIG. 9 is a diagram illustrating an example process 900 performed, for example, by a device, in accordance with various aspects of the present disclosure. Example process 900 is an example where the device (e.g., device 130 depicted in FIG. 2, device 420 depicted in FIGS. 4 and 5, device 620 depicted in FIGS. 6 and 7, and/or the like) performs operations associated with certificate based application descriptors for network slice selection.

As shown in FIG. 9, in some aspects, process 900 may include receiving, from a UE, a request for a network slice for executing an application (block 910). For example, the device (e.g., using communication unit 294, controller/processor 290, memory 292, and/or the like) may receive, from a UE, a request for a network slice for executing an application, as described above. In some aspects, the request includes a first certificate associated with obtaining the network slice.

As further shown in FIG. 9, in some aspects, process 900 may include transmitting the first certificate to an application service provider for validation (block 920). For example, the device (e.g., using communication unit 294, controller/processor 290, memory 292, and/or the like) may transmit the first certificate to an application service provider for validation, as described above.

As further shown in FIG. 9, in some aspects, process 900 may include transmitting an indication to the UE that the network slice is available to the UE based at least in part on the validation (block 930). For example, the device (e.g., using communication unit 294, controller/processor 290, memory 292, and/or the like) may transmit an indication to the UE that the network slice is available to the UE based at least in part on the validation, as described above.

Process 900 may include additional aspects, such as any single aspect or any combination of aspects described below and/or in connection with one or more other processes described elsewhere herein.

In a first aspect, the device is one or more of a mobile network operator, an access and mobility management function, or a policy and control function.

In a second aspect, alone or in combination with the first aspect, process 900 includes determining the network slice based at least in part on the validation Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
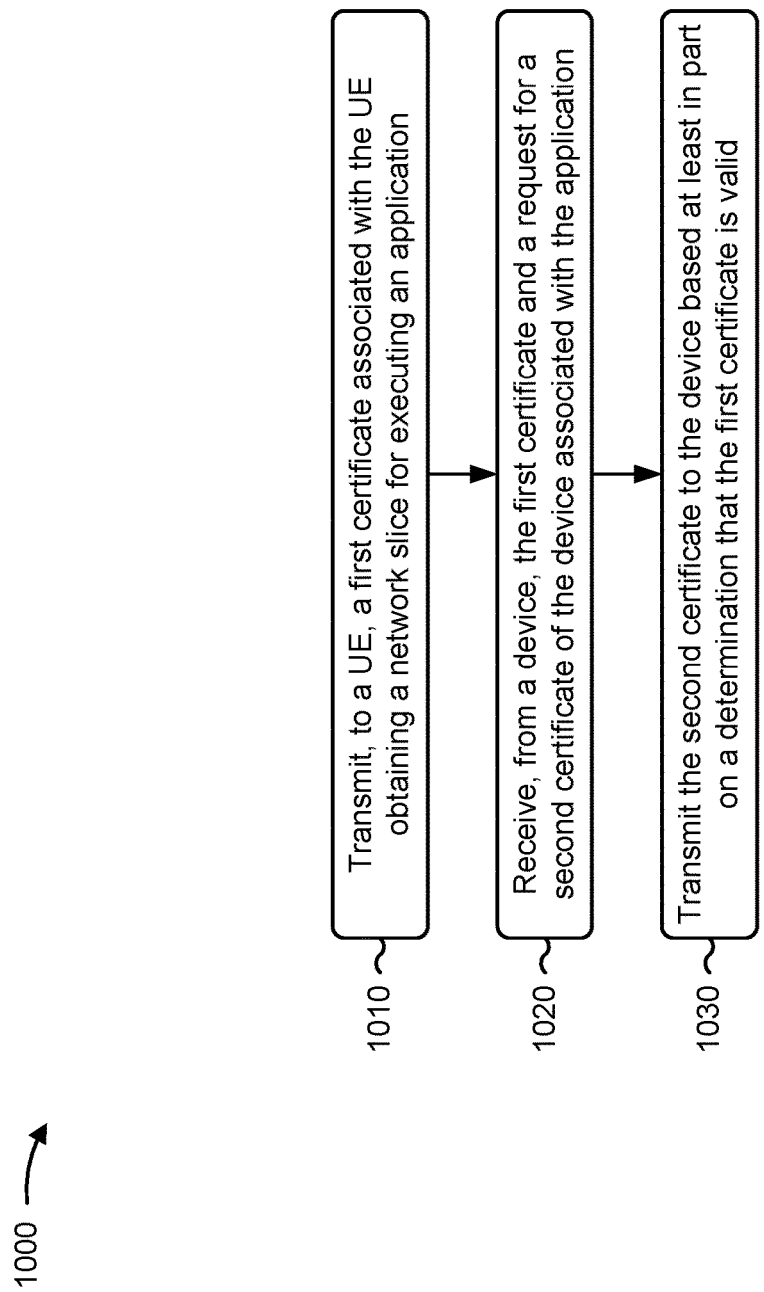
FIG. 10 is a diagram illustrating an example process performed, for example, by an ASP, in accordance with various aspects of the present disclosure.

FIG. 10 is a diagram illustrating an example process 1000 performed, for example, by an ASP, in accordance with various aspects of the present disclosure. Example process 1000 is an example where the ASP (e.g., device 130 depicted in FIG. 2, ASP 430 depicted in FIGS. 4 and 5, ASP 630 depicted in FIGS. 6 and 7, and/or the like) performs operations associated with certificate based application descriptors for network slice selection.

As shown in FIG. 10, in some aspects, process 1000 may include transmitting, to a UE, a first certificate associated with the UE obtaining a network slice for executing an application (block 1010). For example, the ASP (e.g., using communication unit 294, controller/processor 290, memory 292, and/or the like) may transmit, to a UE, a first certificate associated with the UE obtaining a network slice for executing an application, as described above.

As further shown in FIG. 10, in some aspects, process 1000 may include receiving, from a device, the first certificate and a request for a second certificate of the device associated with the application (block 1020). For example, the ASP (e.g., using communication unit 294, controller/processor 290, memory 292, and/or the like) may receive, from a device, the first certificate and a request for a second certificate of the device associated with the application, as described above.

As further shown in FIG. 10, in some aspects, process 1000 may include transmitting the second certificate to the device based at least in part on a determination that the first certificate is valid (block 1030). For example, the ASP (e.g., using communication unit 294, controller/processor 290, memory 292, and/or the like) may transmit the second certificate to the device based at least in part on a determination that the first certificate is valid, as described above.

Process 1000 may include additional aspects, such as any single aspect or any combination of aspects described below and/or in connection with one or more other processes described elsewhere herein.

In a first aspect, process 1000 includes establishing the second certificate with the device.

In a second aspect, alone or in combination with the first aspect, the device is one or more of a mobile network operator, an access and mobility management function, or a policy and control function.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a device, in accordance with various aspects of the present disclosure. Example process 1100 is an example where the device (e.g., device 130 depicted in FIG. 2, device 420 depicted in FIGS. 4 and 5, device 620 depicted in FIGS. 6 and 7, and/or the like) performs operations associated with certificate based application descriptors for network slice selection.

As shown in FIG. 11, in some aspects, process 1100 may include generating a first certificate associated with a UE obtaining a network slice (block 1110). For example, the device (e.g., using communication unit 294, controller/processor 290, memory 292, and/or the like) may generate a first certificate associated with a user equipment (UE) obtaining a network slice, as described above.

As further shown in FIG. 11, in some aspects, process 1100 may include transmitting the first certificate to an ASP (block 1120). For example, the device (e.g., using communication unit 294, controller/processor 290, memory 292, and/or the like) may transmit the first certificate to an ASP, as described above.

As further shown in FIG. 11, in some aspects, process 1100 may include providing a private key for the first certificate to the UE (block 1130). For example, the device (e.g., using communication unit 294, controller/processor 290, memory 292, and/or the like) may provide a private key for the first certificate to the UE, as described above.

As further shown in FIG. 11, in some aspects, process 1100 may include transmitting an indication, to the UE with the first certificate, that the network slice is available to the UE for the application (block 1140). For example, the device (e.g., using communication unit 294, controller/processor 290, memory 292, and/or the like) may transmit an indication, to the UE with the first certificate, that the network slice is available to the UE for the application, as described above.

Process 1100 may include additional aspects, such as any single aspect or any combination of aspects described below and/or in connection with one or more other processes described elsewhere herein.

In a first aspect, the device is one or more of a mobile network operator, an access and mobility management function, or a policy and control function.

In a second aspect, alone or in combination with the first aspect, process 1100 includes updating a UE route selection policy.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by an ASP, in accordance with various aspects of the present disclosure. Example process 1200 is an example where the ASP (e.g., device 130 depicted in FIG. 2, ASP 430 depicted in FIGS. 4 and 5, ASP 630 depicted in FIGS. 6 and 7, and/or the like) performs operations associated with certificate based application descriptors for network slice selection.

As shown in FIG. 12, in some aspects, process 1200 may include receiving, from a device, a first certificate associated with a UE obtaining a network slice for executing an application (block 1210). For example, the ASP (e.g., using communication unit 294, controller/processor 290, memory 292, and/or the like) may receive, from a device, a first certificate associated with a UE obtaining a network slice for executing an application, as described above.

As further shown in FIG. 12, in some aspects, process 1200 may include transmitting the first certificate to the application at the UE (block 1220). For example, the ASP (e.g., using communication unit 294, controller/processor 290, memory 292, and/or the like) may transmit the first certificate to the application at the UE, as described above.

Process 1200 may include additional aspects, such as any single aspect or any combination of aspects described below and/or in connection with one or more other processes described elsewhere herein.

In a first aspect, the device is one or more of a mobile network operator, an access and mobility management function, or a policy and control function.

In a second aspect, alone or in combination with the first aspect, process 1200 includes generating a signature for the network slice.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a first slice certificate associated with obtaining a network slice for executing an application;
   transmitting, to a device, a request for the network slice with the first slice certificate; and
   receiving an indication that the network slice is available to the UE for the application, based at least in part on the request, wherein the UE uses a token to securely map the application to the network slice.

2. The method of claim 1, wherein the device is one or more of a mobile network operator, an access and mobility management function, or a policy and control function.

3. The method of claim 1, wherein the first slice certificate is received from an application service provider that has secret data of the application, wherein the application has permission from the device to use the network slice.

4. The method of claim 3, wherein the application has the secret data and receives the first slice certificate.

5. The method of claim 3, wherein the request includes a timestamp and a signature generated by encrypting the secret data and the timestamp with a private key for the first slice certificate.

6. The method of claim 5, further comprising generating the signature by encrypting the secret data and the timestamp with a public key for the first slice certificate.

7. The method of claim 1, further comprising establishing a protocol data unit session based at least in part on the first slice certificate.

8. The method of claim 1, further comprising determining whether to transmit the request for the network slice based at least in part on statistics associated with the application.

9. The method of claim 1, wherein securely mapping the application to the network slice comprises securely mapping the application to the network slice using a modem of the UE.

10. The method of claim 1, further comprising notifying, by a modem of the UE, the application of the network slice.

11. The method of claim 1, wherein the first slice certificate is received from the device, and the device is an access and mobility management function entity.

12. The method of claim 11, wherein the application receives the first slice certificate from an application service provider and provides the first slice certificate to a modem of the UE in association with the request for the network slice, and wherein the method further comprises validating, at the modem of the UE, the first slice certificate from the application on the UE with the first slice certificate received from the device.

13. The method of claim 11, wherein the application receives the first slice certificate from an application service provider and provides the first slice certificate to a modem of the UE in association with the request for the network slice, and wherein the method further comprises validating, at the modem of the UE, a signature from the application on the UE with a signature in a UE route selection policy.

14. A method performed by a device, comprising:
receiving, from a user equipment (UE), a request for a network slice for executing an application, wherein the request includes a first slice certificate associated with obtaining the network slice;
transmitting the first slice certificate to an application service provider for validation; and
transmitting an indication to the UE that the network slice is available to the UE based at least in part on the validation, wherein the application is securely mapped to the network slice using a token.

15. The method of claim 14, wherein the device is one or more of a mobile network operator, an access and mobility management function, or a policy and control function.

16. The method of claim 14, further comprising determining the network slice based at least in part on the validation.

17. A method performed by an application service provider, comprising:
transmitting, to a user equipment (UE), a first slice certificate associated with the UE obtaining a network slice for executing an application;
receiving, from a device, the first slice certificate and a request for a second slice certificate of the device associated with the application; and
transmitting the second slice certificate to the device based at least in part on a determination that the first slice certificate is valid, wherein the application is securely mapped to the network slice using a token.

18. The method of claim 17, further comprising establishing the second slice certificate with the device.

19. The method of claim 17, wherein the device is one or more of a mobile network operator, an access and mobility management function, or a policy and control function.

20. A method performed by a device, comprising:
generating a first slice certificate associated with a user equipment (UE) obtaining a network slice;
transmitting the first slice certificate to an application service provider;
providing a private key for the first slice certificate to the UE; and
transmitting an indication, to the UE with the first slice certificate, that the network slice is available to the UE for an application, wherein the application is securely mapped to the network slice using a token.

21. The method of claim 20, wherein the device is one or more of a mobile network operator, an access and mobility management function, or a policy and control function.

22. The method of claim 20, further comprising updating a UE route selection policy.

23. A method performed by an application service provider, comprising:
receiving, from a device, a first slice certificate associated with a user equipment (UE) obtaining a network slice for executing an application; and
transmitting the first slice certificate to the application at the UE, wherein the application is securely mapped to the network slice using a token.

24. The method of claim 23, wherein the device is one or more of a mobile network operator, an access and mobility management function, or a policy and control function.

25. The method of claim 23, further comprising generating a signature for the network slice.

* * * * *